US008218578B2

(12) United States Patent
Onomatsu

(10) Patent No.: US 8,218,578 B2
(45) Date of Patent: Jul. 10, 2012

(54) BROADCAST RECEIVING APPARATUS

(75) Inventor: Takehiro Onomatsu, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 642 days.

(21) Appl. No.: 11/730,862

(22) Filed: Apr. 4, 2007

(65) Prior Publication Data

US 2007/0237105 A1 Oct. 11, 2007

(30) Foreign Application Priority Data

Apr. 5, 2006 (JP) ................................ 2006-103942

(51) Int. Cl.
*H04J 3/06* (2006.01)

(52) U.S. Cl. ........................................ 370/509; 370/350

(58) Field of Classification Search .................. 370/509; 348/558; 455/550.1; 725/50
See application file for complete search history.

(56) References Cited

U.S. PATENT DOCUMENTS

| | | | | |
|---|---|---|---|---|
| 6,229,763 | B1 * | 5/2001 | Sok | 368/10 |
| 2001/0033625 | A1 * | 10/2001 | Ninomiya et al. | 375/316 |
| 2004/0038704 | A1 * | 2/2004 | Takagi | 455/550.1 |
| 2004/0100585 | A1 * | 5/2004 | Ikeguchi | 348/558 |
| 2005/0071872 | A1 * | 3/2005 | Case | 725/50 |

FOREIGN PATENT DOCUMENTS

| | | | |
|---|---|---|---|
| JP | 7-307931 | A | 11/1995 |
| JP | 2001-298465 | A | 10/2001 |
| JP | 2004-80677 | A | 3/2004 |
| JP | 2004-096368 | A | 3/2004 |
| JP | 2005-127921 | A | 5/2005 |
| JP | 2005-233750 | A | 9/2005 |
| WO | WO 01/48569 | A1 | 7/2001 |

OTHER PUBLICATIONS

Japanese Office Action dated Nov. 8, 2011 with English translation (eight (8) pages).

* cited by examiner

*Primary Examiner* — Anh-Vu Ly
*Assistant Examiner* — Maharishi Khirodhar
(74) *Attorney, Agent, or Firm* — Crowell & Moring LLP

(57) ABSTRACT

Disclosed is a broadcast receiving apparatus including an analog time information extracting member to extract time information included in an analog broadcast signal; a digital time information extracting member to extract time information included in a digital broadcast signal; a time setting member to automatically set time of the clock in accordance with time information; a display control member to output and display a setting screen to set a channel for time setting, the setting screen being used to set which broadcast channel is selected, the channel including time information which is used by the time setting member to set time of the clock; and an operation input unit to input operation command from external.

4 Claims, 5 Drawing Sheets

BROADCAST RECEIVING APPARATUS

BACKGROUND OF THE INVENTION

1. Field of the Invention

The present invention relates to a broadcast receiving apparatus that is capable of receiving both of a digital broadcast and an analog broadcast.

2. Description of the Related Art

Conventionally, with respect to a broadcast receiving apparatus that receives an analog broadcast, there has been an apparatus that is provided with a function to automatically set an internal clock thereof, by obtaining time information from a broadcast signal. For example, in a case where it is known that a television broadcast of a predetermined broadcast station gives time signal at a predetermined time, there is an apparatus that extracts an audio signal of the time signal and adjusts an internal clock thereof in accordance with the audio signal. Alternatively, in a case where there is a broadcast station that transmits time data to an extended data service (XDS) signal, the XDS signal being inserted in an analog television broadcast signal, there is an apparatus that extracts the time data of the XDS signal and sets an internal clock thereof in accordance with the extracted time data.

Further, with respect to a digital broadcast of recent years, since time information is inserted in a streaming data which transmits image data and audio data, internal clock can be set in accordance with this time information.

In Japanese Patent Application Publication (Laid-open) No. 2005-127921 and Japanese Patent Application Publication (Laid-open) No. 2005-233750, a technique to set an internal clock in accordance with a digital broadcast signal is disclosed. In Japanese Patent Application Publication (Laid-open) Tokukaihei 07-307931 and Japanese Patent Application Publication (Laid-open) No. 2004-096368, a technique to set an internal clock in accordance with an analog broadcast signal is disclosed.

With respect to the digital broadcast, since time information is always transmitted, there is an advantage that time setting can be conducted quickly. However, since time information is inserted by a producing station of a broadcast program when the streaming data is generated, it is difficult to alter only that portion afterwards. Therefore, in a case where a local station transmits a digital broadcast of a main station with intermediation, or in a case where the broadcast program is re-broadcasted at a different time, there is a problem that time information in the broadcast signal is shifted from the actual time, or is completely different from the actual time.

On the other hand, with respect to the analog broadcast, there is an advantage in that since the time data is structured to be inserted in between the broadcast signals, each of the stations can insert correct time information. However, since time information is inserted in between the signals that are limited, time information cannot be transmitted frequently, and thus time setting requires time.

Accordingly, a channel that is suitable to conduct time setting differs depending on the region where the apparatus is used. In some regions, the suitable channel is a predetermined channel of the digital broadcast, and in other regions, the suitable channel is a predetermined channel of the analog broadcast.

SUMMARY OF THE INVENTION

The present invention has been made in view of the above circumstances. An object of the present invention is to provide a broadcast receiving apparatus that is capable of easily selecting a channel for time setting, the selection being made from a wide option of channels of analog broadcast and channels of digital broadcast.

According to one aspect of the present invention, there is provided a broadcast receiving apparatus provided with a clock to count time and a tuner to receive a broadcast signal of an arbitrary channel selectively from a channel of an analog broadcast and a digital broadcast, the broadcast receiving apparatus comprising: an analog time information extracting member to extract time information included in an analog broadcast signal; a digital time information extracting member to extract time information included in a digital broadcast signal; a time setting member to automatically set time of the clock in accordance with time information; a display control member to output and display a setting screen to set a channel for time setting, the setting screen being used to set which broadcast channel is selected, the channel including time information which is used by the time setting member to set time of the clock; and an operation input unit to input operation command from outside of the broadcast receiving apparatus, wherein an analog broadcast channel which is capable of time setting and a digital broadcast channel which is capable of time setting are displayed in the setting screen to set the channel for time setting, in a mixed manner and in a state capable of being selected by the operation input unit.

According to the afore-mentioned measure, a user can set a channel for time setting to an analog channel or to a digital channel within one setting screen. Therefore, the user can easily select the channel for time setting that is appropriate for the region in which it is used and that meets a preference of the user.

Preferably, a scanning display section to successively display a broadcast channel which is capable of obtaining time information, during channel scanning to confirm whether time information is obtainable for each broadcast channel, and a channel selection display section to select the broadcast channel in accordance with an operation input of the operation input unit, are generated in the setting screen to set the channel for time setting.

According to the afore-mentioned display, confirmations such as confirming a channel that can set time and confirming whether it is during scanning operation and thus the number of channels that can set time will increase, can be conducted by the scanning display section. In addition, processing relating to selection can be conducted separately by the channel selection display section.

Preferably, a time exemplification section which is capable of exemplifying time in accordance with time information of the broadcast channel is provided to the setting screen to set the channel for time setting, in a case where the broadcast channel is selected in the channel selection display section. More preferably, the time exemplification section is provided in a window display which is displayed so as to overlap the channel selection display section. Further preferably, an operation button to select whether to set the selected broadcast channel as the channel for time setting or not is displayed in the window display.

According to the afore-mentioned display, setting can be conducted after confirming time information of the selected broadcast channel.

Preferably, exemplification of time is conducted in the time exemplification section in a case where the selected broadcast channel is a digital channel, and exemplification of time is not conducted in the time exemplification section in a case where the selected broadcast channel is an analog channel.

According to the afore-mentioned control, the user can recognize that the digital broadcast channel can obtain time information quickly, and the analog broadcast channel takes time to obtain time information.

As described above, according to the present invention, the channel for time setting can be easily selected from the analog channel and the digital channel, so as to meet the region in which it is used and the user's preference.

BRIEF DESCRIPTION OF THE DRAWINGS

The above and further objects, features and advantages of the present invention will become more apparent from the following detailed description taken in conjunction with the accompanying drawings, wherein.

DESCRIPTION OF THE PREFERRED EMBODIMENTS

Hereinafter, the embodiment of the present invention will be described with reference to drawings.

Figure 1:
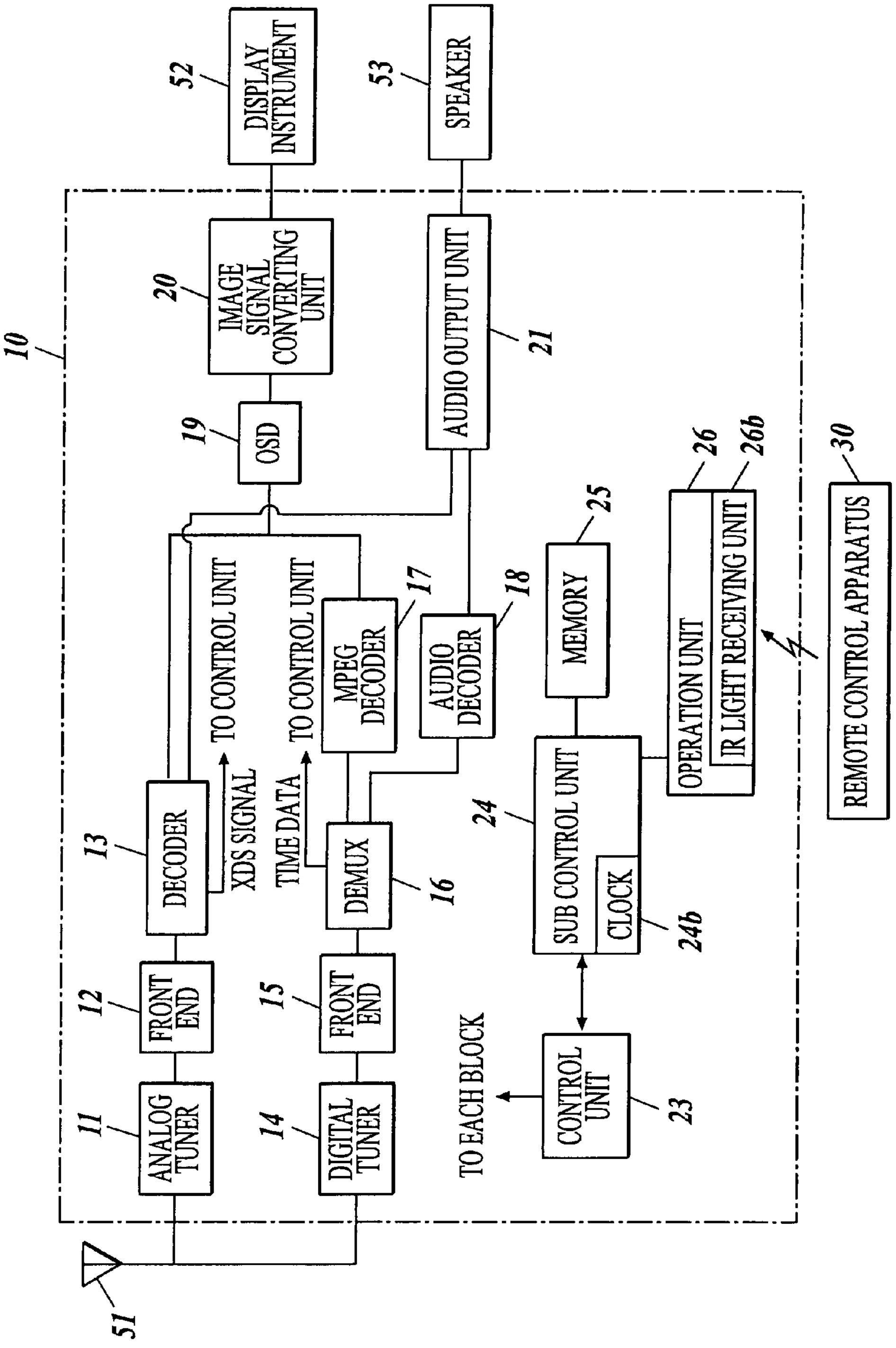
FIG. 1 is a block diagram showing an entire structure of a broadcast receiving apparatus according to an embodiment of the present invention.

FIG. 1 is a block diagram showing an entire structure of a broadcast receiving apparatus according to an embodiment of the present invention.

The broadcast receiving apparatus 10 of the present embodiment is a television broadcast tuner apparatus which is capable of receiving both of a digital broadcast and an analog broadcast. The broadcast receiving apparatus 10 is provided with an analog tuner 11 to selectively receive an analog broadcast signal that is input from an antenna 51, a front end to conduct a demodulation processing of the analog broadcast signal, a decoder 13 to convert the demodulated broadcast signal into an image signal of Y/Cr/Cb, image signal of RGB, and an audio signal, a digital tuner 14 to selectively receive a digital broadcast signal that is input from the antenna 51, a front end 15 to conduct demodulation processing and the like of the digital broadcast signal, a demultiplexer 16 to separate image data and audio data from additional information with respect to the demodulated digital broadcast signal, an MPEG decoder 17 to decode the digital image data into an image signal of Y/Cr/Cb, an audio decoder 18 to decode the digital audio data into an analog audio signal, an On Screen Display (OSD) controller 19 to overwrite display signal such as text and pattern on a part of the image signal, an image signal converting unit 20 to convert the image signal into a signal for output display, an audio output unit 21 to conduct external output of the audio signal, and the like.

In addition, the broadcast receiving apparatus 10 is provided with a control unit 23 to control each of the afore-mentioned signal processing blocks in an integrated manner, a sub control unit 24 to conduct control of a user interface processing and the like, a real time clock 24*b* as a clock which is built in the sub control unit 24, a memory unit 25 such as a non-volatile memory in which setting data and the like are stored, and an operation unit 26 which includes a light-receiving unit 26*b* that receives a remote control signal from a remote control apparatus 30, the remote control apparatus being input with an operation signal of an operation button, and the like.

The afore-mentioned decoder 13, in a case where XDS signal is included in the analog broadcast signal, has a function (analog time information extracting member) to extract the XDS signal and to output the XDS signal to the control unit 23. The demultiplexer 16 has a function (digital time information extracting member) to extract additional information which contains time data, from a stream data of the digital broadcast, and to output the additional information to the control unit 23. These time information are sent from the control unit 23 to the sub control unit 24, and are used for adjustment processing of the real time clock 24*b*. Here, the structure of extracting the XDS signal and the structure of extracting the additional information which contains time data, may apply various kinds of known techniques other than the structures mentioned above.

To the inside of the sub control unit 24, a central processing unit (CPU), a random access memory (RAM) and a read only memory (ROM) are equipped. The sub control unit 24 inputs signal of the operation unit 26 in accordance with a control program in the ROM, and exchanges various kinds of data and command with the control unit 23.

The afore-mentioned sub control unit 24 also serves as a display control member to conduct output and display of the setting screen to set the channel for time setting. For example, in a case where an operation signal to display a setting menu is input from the operation unit 26, the sub control unit 24 generates image data of a corresponding setting screen and sends the image data to the OSD controller 19. Thus, the setting screen is output and displayed to an external display instrument 52.

In addition, the afore-mentioned sub control unit 24 also serves as a time setting member. For example, in a case where it is determined that it is a predetermined time in accordance with a signal of the real time clock 24*b*, the sub control unit 24 makes the analog tuner 11 and the digital tuner 14 to receive a broadcast signal of a set channel, obtains the XDS signal of the analog broadcast or the time data of the digital broadcast, and adjusts the time of the real time clock 24*b* by reconstructing time information from the XDS signal or the time data.

Figure 2A:
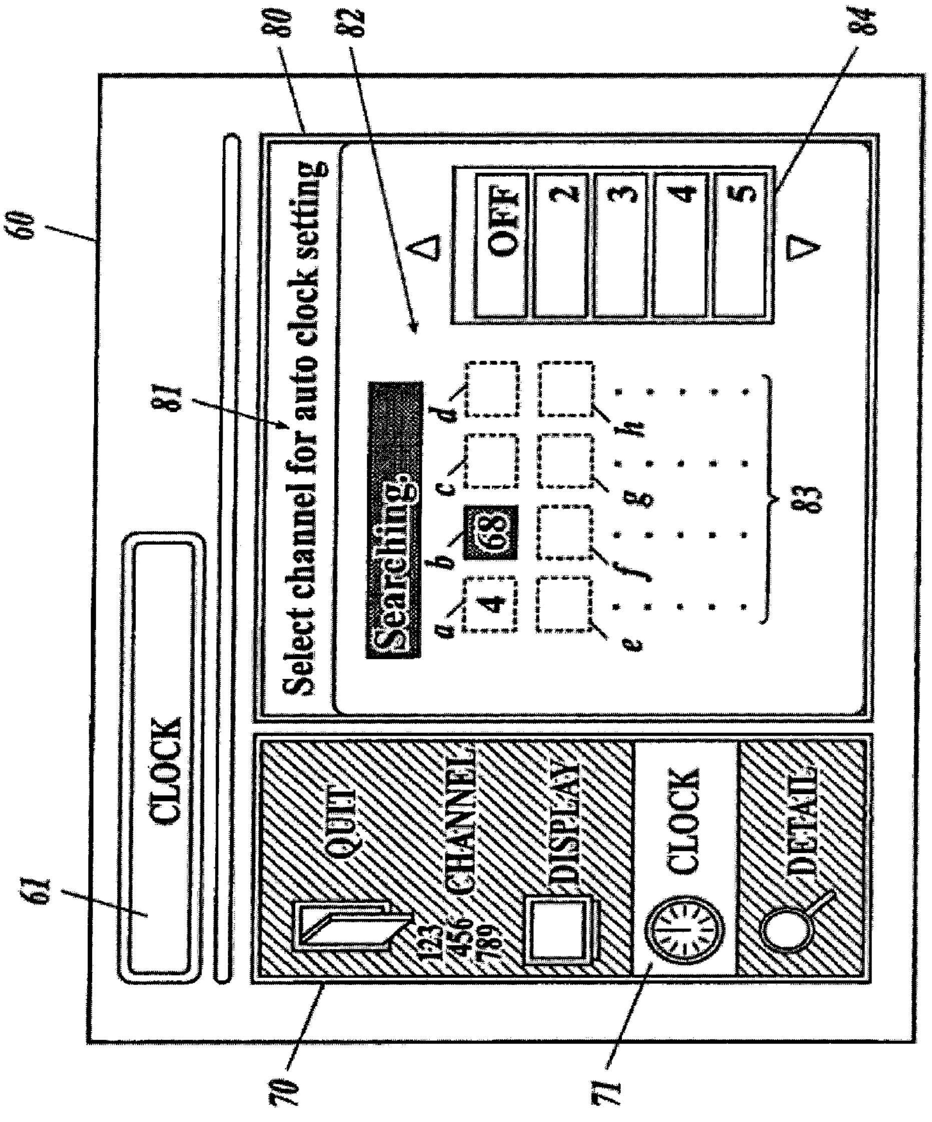
FIG. 2A is an image showing a setting screen to set a channel for time setting.
Figure 2B:
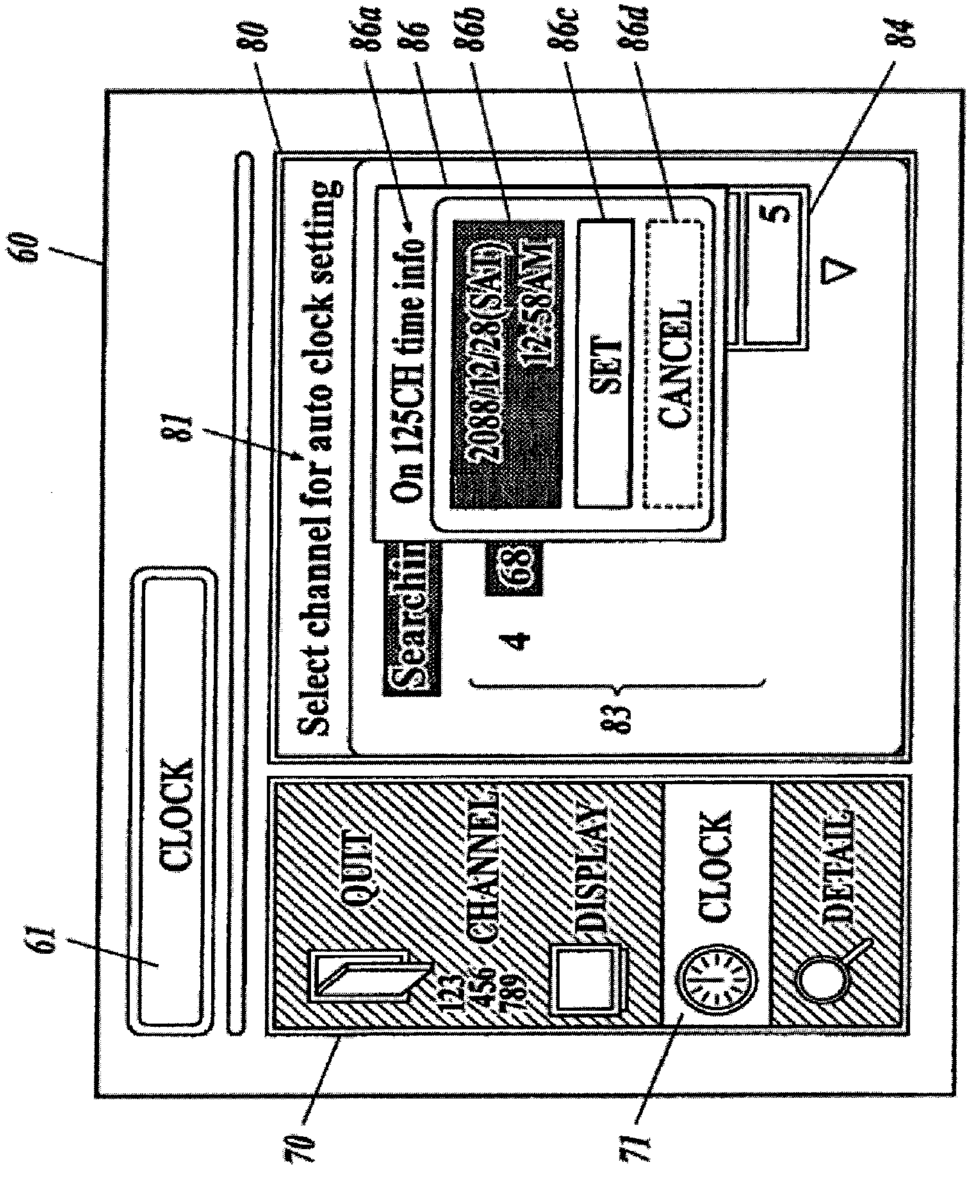
FIG. 2B is an image showing the setting screen to set the channel for time setting.

Hereinafter, processing of auto adjust channel (channel for time setting) setting will be described with reference to the images of FIG. 2A and FIG. 2B showing a setting screen, and to the flow charts of FIG. 3 and FIG. 4.

FIG. 2A and FIG. 2B are images showing a setting screen to set the auto adjust channel.

The processing of auto adjust channel setting is initiated by a user conducting an operation of a setting menu of a remote controller and further selecting and deciding item 71 "CLOCK" of the setting menu, the item 71 being an item to conduct settings relating to time. When this setting processing is initiated, the processing of auto adjust channel scanning of FIG. 3 is also initiated, and the processing of adjust channel setting of FIG. 4 is executed in parallel with the processing of auto adjust channel scanning.

When performing the processing of the auto adjust channel setting, the setting screen 60 as shown in FIG. 2A is output and displayed by the processing of the OSD controller 19. In this setting screen 60, title display 61 is conducted in the upper portion to show a setting item, menu item display 70 is conducted at the left side to display a setting item and other setting items as a list, setting content display frame 80 is displayed at the right side of the screen to show a content of the auto adjust channel setting. In the menu item display 70, field of the selected item is displayed in a different manner from fields of other items so that the setting item that is presently selected can be recognized.

In the setting content display frame 80, an explanation display 81 arranged in the upper portion to show details of the setting content, a scanning result display section (scanning display section) 83 to display a list of channels that are capable of setting time, an executing processing display section 82 in an upper portion of the scanning result display section 83 to show a processing content such as scanning and the like, and a selecting section (channel selection display section) 84 to select a channel that conducts time setting, are provided.

The scanning result display section 83 is a section in which a channel that is capable of setting time is displayed in a plurality of cells a, b, c, . . . that are arranged in rows and columns. Here, the dotted lines which show the frame of the cells a, b, c, . . . in FIG. 2A and FIG. 2B are lines that are not observable.

To this scanning result display section 83, during a procedure of channel scanning which conducts research on whether a channel is capable of time setting or not for each channel, a channel number which is under scanning and a channel number which revealed to be capable of setting time are displayed in the plurality of cells a, b, c, . . . in order. That is, a channel number which is currently under research (under channel scanning) is displayed in the first cell (cell b in FIG. 2A) in a display manner different from an ordinary display manner (for example, by a reverse text), and is consecutively switched in accordance with channel scanning. In a case where a channel which is capable of time setting is found during the procedure of channel scanning, display of that cell terminates with the channel and display is changed to an ordinary display manner (for example, black text over an ordinary background color). Then, channel scanning is continued by moving on to the next cell (cell c in FIG. 2A).

When scanning is concluded for all of the channels in accordance with the afore-mentioned processing, channel that is capable of time setting is displayed as a list in the plurality of cells a, b, c, . . . in the scanning result display section 83. In the setting screen 60 according to the present invention, channel that can be displayed as a list in this scanning result display section 83 is not distinguished whether it is the digital broadcast or the analog broadcast, and channels for both broadcasts are mixed.

The selecting section 84 displays a list of channel numbers which are usable in one direction. The channel number to be selected can be moved up and down within the list by operating an up button or a down button of the remote control apparatus 30. Further, the list can be scrolled or a page can be turned. In addition, a setting item of "OFF" is provided at the upper most portion of the list to conduct a selection so as not to conduct automatic setting of the internal clock.

In this selecting section 84, the channel which is capable of time setting, found by the afore-mentioned channel scanning, is displayed in a dark color so as to show that it is capable of setting, and the channel which is not capable of time setting or is not yet scanned is displayed in a light color (for example, gray-color display) to show that it is not capable of setting. In the setting screen 60 according to the present invention, the channel numbers that are displayed in this selecting section 84 are not distinguished whether it is the digital broadcast or the analog broadcast, and channels for both broadcasts are mixed.

In a case where the remote control 30 is operated to select the channel which is capable of time setting in the selecting section 84 (or in a case where selection is made and a decision button is operated), a setting window 86 as a window display section as shown in FIG. 2B is displayed. This selection of channel can also be conducted during the afore-mentioned channel scanning.

This setting window 86, which is displayed so as to overlap with the selecting section 84 inside the setting content display frame 80, is provided with a display 86*a* to show broadcast station information of the selected channel number, a time exemplification section 86*b* to exemplify a time in accordance with time information obtained from the broadcast channel, selecting buttons 86*c* and 86*d* to select whether to set as the auto adjust channel or not, and the like.

A user can decide whether or not to set the broadcast channel as the auto adjust channel while observing the broadcast station information and time information which is actually obtained, by this setting window 86. However, in a case where the selected broadcast channel is the analog broadcast, time is not displayed in the time exemplification section 86*b* since time information is not always obtained. In this case, a display of notifying that obtainment of time information requires time and the like may be displayed.

When the user selects and determines the operation button 86*d* of cancel by the remote control apparatus 30 in this setting window 86, the processing can be renewed from the selection of the channel by returning to the screen of FIG. 2A again. By selecting and determining the operation button 86*c* of set in the setting window 86, the auto adjust channel is set to this selected channel. The setting information is recorded and stored in the memory unit 25, and the screen display of setting menu is terminated.

Figure 3:
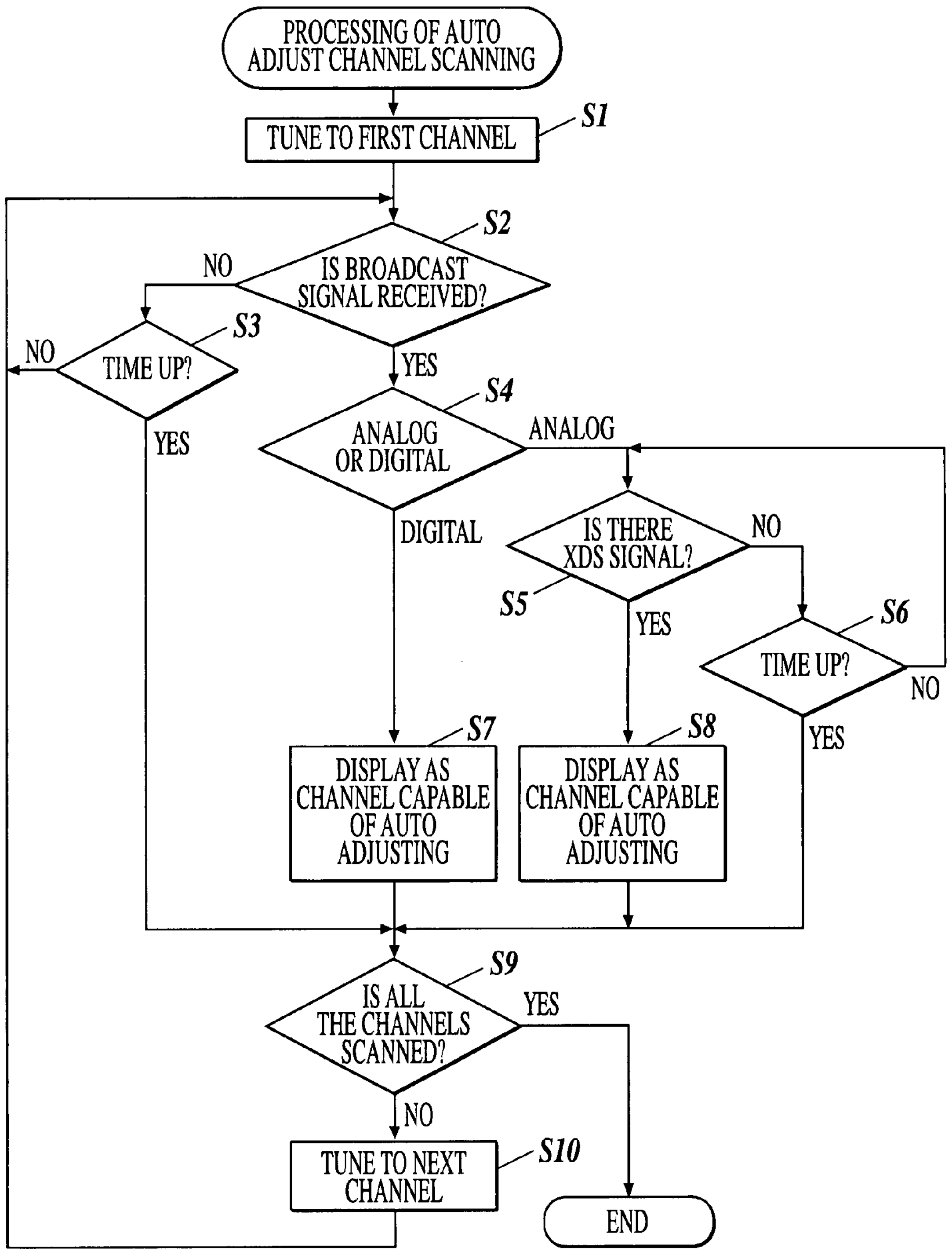
FIG. 3 is a flow chart showing a processing of adjust channel scanning which is executed when setting the channel for time setting.
Figure 4:
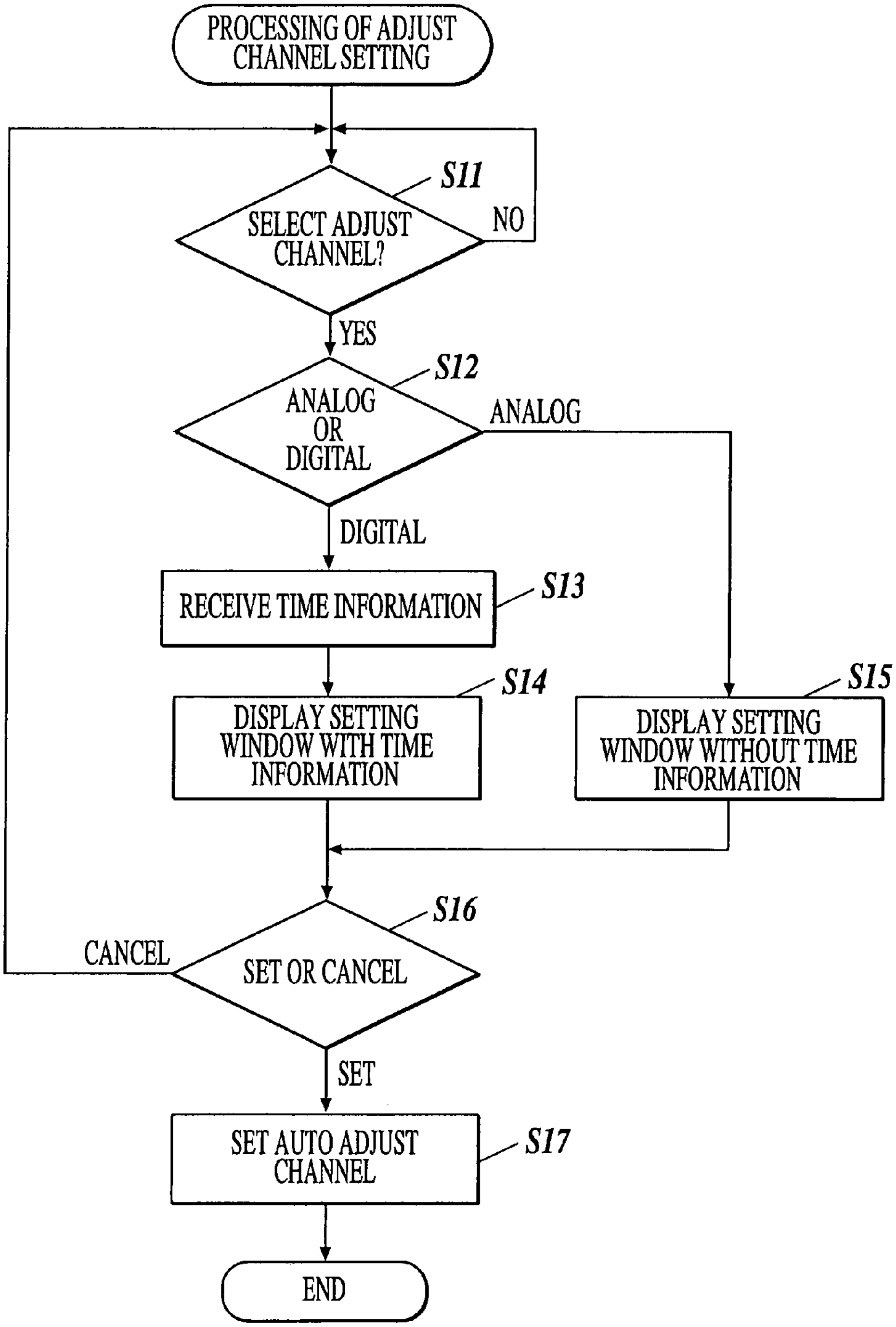
FIG. 4 is a flow chart showing a processing of adjust channel setting which is executed in parallel with the scanning processing of FIG. 3.

FIG. 3 shows a flow chart of a processing of an adjust channel scanning which is executed by the sub control unit 24, and FIG. 4 shows a flow chart of a processing of an adjust channel setting which is executed by the sub control unit 24.

As afore-described, when the processing of auto adjust channel setting is initiated by the setting screens of FIG. 2A and FIG. 2B, the processing of auto adjust channel scanning shown in FIG. 3 is executed in parallel with the processing of the adjust channel setting shown in FIG. 4.

That is, with respect to the processing of the auto adjust channel scanning shown in FIG. 3, receiving channel is first tuned to a first channel which has the youngest channel number (step S1), and confirms whether the broadcast signal is received by the analog tuner 11 or the digital tuner 14 (step S2). When it is confirmed that the broadcast signal is received, it moves on to the succeeding step S4, and when it is not confirmed, it repeats confirming processing for a certain period of time (step S3). In a case where it is not confirmed that the broadcast signal is received after the certain period time has elapsed, it moves on to step S9.

After moving on to step S4 by confirming that the broadcast signal is received, it is discriminated in this step, whether it is the analog broadcast or the digital broadcast. In a case where it is digital, it is determined that there is transmission of time information, and display control is conducted so as to display the channel number in the scanning result display section 83 in an ordinary manner and to set the corresponding channel number in the selecting section 84 as black text (step S7).

On the other hand, in a case where it is analog, it confirms the presence or absence of the XDS signal in the broadcast signal in order to confirm whether it is a broadcast channel that sends time information or not (step S5). Confirmation is repeated for a predetermined time period until it is confirmed (step S6), and in a case where it is confirmed, display control is conducted so that the channel number of the channel is displayed in the scanning result display section 83 in an ordinary manner as the channel that is capable of time setting, and to set the corresponding channel number in the selecting section 84 as black text (step S8). In a case where the presence of the XDS signal is not confirmed, it moves on to step S9.

In step S9, it is determined whether scanning is conducted for all of the channels. In a case where scanning is conducted for not all of the channels, receiving channel is tuned to the next channel (step S10), and repeats the processing from step S2. In a case where scanning is conducted for all of the channels, the processing of auto adjust channel scanning is completed.

The processing of adjust channel setting shown in FIG. 4 conducts selection processing of selecting section 84 and processing of the setting window 86. In this processing, it is first confirmed whether a selection operation of a channel for time setting has been conducted at the selecting section 84 by a signal of the remote control apparatus 30 (step S11), and this confirmation is continued in a case where the operation is not conducted, and it moves on to step S12 in a case where the operation is conducted.

In step S12, it is discriminated whether it is a channel of analog broadcast or a channel of digital broadcast. In a case where it is the digital broadcast, the receiving channel of the digital tuner 14 is tuned to this channel and time information is obtained in accordance with additional information which is separated by the demultiplexer 16 (step S13). Subsequently, in a state of displaying time information in accordance with this time information, the setting window 86 of FIG. 2B is output and displayed (step S14).

On the other hand, in a case where it is discriminated as the analog broadcast in step S12, the setting window 86 of FIG. 2B is output and displayed without displaying time information in step S15.

After displaying the setting window 86, it discriminates the input of operation buttons 86*c* of set or 86*d* of cancel (step S16). In a case where the operation of set is conducted, a processing to set the selected channel as the channel for time setting (step S17) is conducted, and in a case where the operation of cancel is conducted, display of the setting window 86 is deleted and returns to step S11.

The afore-mentioned processing of auto adjust channel setting shown in FIG. 2A and FIG. 2B is accomplished by executing the processing of auto adjust scanning shown in FIG. 3 in parallel with the processing of adjust channel setting shown in FIG. 4.

As described, according to the broadcast receiving apparatus 10 of the present embodiment, the user can set the channel for time setting to the analog channel or to the digital channel in one setting screen. Therefore, the user can easily set the channel for time setting that meets the region of usage and preference of the user.

In addition, by using the scanning result display section 83, confirmations such as confirming a channel that can set time and confirming whether it is during scanning operation and thus the number of channels that can set time will increase, can be conducted. In addition, processing relating to selection can be conducted separately by the selecting section 84.

In addition, since time information of the selected channel can be confirmed in the setting window 86 before setting the channel, setting can be conducted without mistake.

Since the setting window 86 is controlled so that time information is not displayed in a case where it is the analog broadcast, it is possible to make the user recognize that the digital broadcast channel can obtain time information quickly, and the analog broadcast channel takes time to obtain time information.

Here, the present invention is not limited to the afore-mentioned embodiment, and various kinds of modification can be applied. For example, in the setting screen 60 to set the channel for time setting, an example in a case where the scanning result display section 83 and the selecting section 84 are separately displayed was described. However, channel may be selected by operation of the remote control 30 within the scanning result display section 83. Further, in the afore-mentioned embodiment, an example in which all of the channels are scanned at the time of setting, with respect to whether it is capable of setting time, was described. However, setting processing may be conducted without channel scanning by using data obtained by scanning in advance. As a way of setting time from the broadcast signal of the analog broadcast, a method to use the XDS signal has been provided as an example. However, other methods to conduct time setting may be included, such as a method in which time adjustment is made by using an audio signal of time signal. In such case, information of the analog channel which is capable of setting time is set in the apparatus beforehand, or information of the analog channel which is capable of setting time may be obtained after the user sets usage region information.

Precise display content and displaying manner of the setting screen, details of the processing shown in the flow charts, and other details shown in the present embodiment can be suitably modified so long as it does not deviate the scope of the invention.

The present invention can be applied to a television tuner apparatus, a recording apparatus or a set top box that are built in with a tuner, and the like.

The entire disclosure of Japanese Patent Application No. 2006-103942 filed on Apr. 5, 2006 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A broadcast receiving apparatus provided with a clock to count time and a tuner to receive a broadcast signal of an arbitrary channel selectively from a channel of an analog broadcast and a digital broadcast, the broadcast receiving apparatus comprising:

an analog time information extracting member to extract time information included in an analog broadcast signal;

a digital time information extracting member to extract time information included in a digital broadcast signal;

a time setting member to automatically set the time of the clock in accordance with time information;

a display control member to output and display a setting screen to set a channel for time setting, the setting screen being used to set which broadcast channel is selected, the selected channel including the time information which is used by the time setting member to set the time of the clock;

an operation input unit to input an operation command, wherein an analog broadcast channel which is capable of the time setting and a digital broadcast channel which is capable of the time setting are displayed in the setting screen to set the channel for the time setting, in a mixed manner and in a state capable of being selected by the operation input unit;

a scanning display section to successively display broadcast channels which are capable of obtaining the time information during a channel scanning operation to confirm whether time information is obtainable using each successively displayed broadcast channel, and a channel selection display section to select a broadcast channel in accordance with an operation command input by the operation input unit, wherein the scanning display section and the channel selection display section are generated in the setting screen to set the channel for time setting; and a time exemplification section that exemplifies a time in accordance with the time information of a broadcast channel provided to the setting screen to set a channel for time setting, in a case where the broadcast channel provided to the setting screen is selected in the channel selection display section, wherein the exemplification of the time is conducted in the time exemplification section in a case where the selected broadcast channel is a digital channel, and wherein exemplification of the time is not conducted in the time exemplification section in a case where the selected broadcast channel is an analog channel even when the time information to set the time of the clock is obtainable in the analog channel which is selected, such that the time is not displayed in the time exemplification section.

2. The broadcast receiving apparatus as claimed in claim 1, wherein the time exemplification section is provided in a window display which is displayed so as to overlap the channel selection display section.

3. The broadcast receiving apparatus as claimed in claim 1, wherein an operation button to select whether to set the selected broadcast channel as the channel for time setting or not is displayed in the window display.

4. The broadcast receiving apparatus as claimed in claim 1, wherein a display of notifying that obtainment of the time information requires time is displayed in the time exemplification section in the case where the selected broadcast channel is the analog channel.

* * * * *